United States Patent [19]
Rhodes et al.

[11] 3,928,267
[45] Dec. 23, 1975

[54] LIQUID STABILIZER SYSTEM FOR POLYVINYL CHLORIDE

[75] Inventors: Philip H. Rhodes; Robert L. Ahr, both of Cincinnati, Ohio

[73] Assignee: Emery Industries, Inc., Cincinnati, Ohio

[22] Filed: Mar. 5, 1973

[21] Appl. No.: 338,163

Related U.S. Application Data

[62] Division of Ser. No. 226,273, Feb. 14, 1972, Pat. No. 3,756,200.

[52] U.S. Cl........ 260/23 XA; 252/406; 260/23.7 H; 260/45.7 P; 260/45.75 R
[51] Int. Cl.² .......................................... C08L 91/00
[58] Field of Search ..... 260/23 XA, 23.7 H, 45.7 P, 260/45.75 R, 45.85 R, 45.95; 252/400

[56] References Cited
UNITED STATES PATENTS

| | | | |
|---|---|---|---|
| 2,711,401 | 6/1955 | Lally | 260/23 XA |
| 2,997,454 | 8/1961 | Leistner | 260/45.8 R |
| 3,202,622 | 8/1965 | Scullin | 260/23 XA |
| 3,255,136 | 6/1966 | Hecker et al. | 260/45.95 |
| 3,558,537 | 1/1971 | Hecker et al. | 260/23 XA |
| 3,575,905 | 4/1971 | Rhodes | 260/23 XA |
| 3,640,953 | 2/1972 | Brecker et al. | 260/23 XA |
| 3,682,853 | 8/1972 | Barie et al. | 260/23 XA |

Primary Examiner—Donald E. Czaja
Assistant Examiner—William E. Parker
Attorney, Agent, or Firm—Gerald A. Baracka; John D. Rice

[57] ABSTRACT

Homogeneous liquid stabilizer compositions are provided which are useful with polyvinyl chloride resins to impart improved antistatic and antifogging properties in addition to stabilizing the resins. The stabilizer solutions are obtained using a specific procedure for blending the individual stabilizer components.

5 Claims, No Drawings

LIQUID STABILIZER SYSTEM FOR POLYVINYL CHLORIDE

This is a division of application Ser. No. 226,273 filed Feb. 14, 1972, now issued as U.S. Pat. No. 3,756,200.

BACKGROUND OF THE INVENTION

Multi-component stabilizers are extensively utilized for the stabilization of polyvinyl chloride resins. Such stabilizer systems, sometimes referred to as stabilizer packages, are commonly employed due to the inability of any one material to sufficiently protect the resins against oxidative, thermal and photochemical degradation and to impart other desirable properties to the end products. In order for a stabilizer package to be effective, it must not only be capable of protecting the polyvinyl chloride resin against loss of physical properties, discoloration or loss of optical clarity, embrittlement, etc., by preventing polymer degradation, but it should also be capable of being readily and uniformly dispersed in the resin. Additionally, the stabilizer system must be compatible with and complement other additives employed for specific end-use applications such as, for example, in food packaging, where antifogging and antistatic properties of the plastic compositions are essential.

One such useful multi-component additive system has recently been described in U.S. Pat. No. 3,558,537. This patent provides polyvinyl chloride resin compositions characterized by having good stability and improved resistance to fogging. The resins stabilized in accordance with this invention are useful for transparent plastic wraps, especially for use with high moisture content items such as food products. The stabilizer/antifogging system of the U.S. Pat. No. 3,558,537 is comprised of partial esters derived from polyglycerol and unsaturated fatty acids, a zinc salt of a monocarboxylic fatty acid and may also contain one or more other additives or modifiers. A particularly useful embodiment of the invention employs the partial ester and zinc salt in combination with an epoxy plasticizer and phosphite stabilizer.

While the stabilizer package described in the U.S. Pat. No. 3,558,537 imparts extremely useful properties to the resin, it is not without certain disadvantages. The four-compartment stabilizer compositions obtained in accordance with the invention are pastes. The compositions do not flow readily at ambient conditions and are often lumpy, heterogeneous masses. These features present processing problems such as inability or difficulty of pumping with conventional process equipment. Another problem associated with the use of the pasty stabilizers of the U.S. Pat. No. 3,558,537 is the difficulty in obtaining uniform dispersion of the mass in the polyvinyl chloride resin. The greatest drawback, however, is the tendency for phase separation (oil settles to the bottom) after preparation and upon standing. While not insurmountable, these problems do complicate the processing and equipment required if such a stabilizer system is to be employed.

It would be extremely useful and advantageous if a homogeneous liquid stabilizer package capable of imparting improved stabilization and antifogging and antistatic properties to polyvinyl chloride resin were available. It would be especially useful if such a stabilizer package was not susceptible to phase separation upon standing. Such a stabilizer composition could be easily handled and incorporated into polyvinyl chloride compositions and homogeneous blends, uniform from batch to batch, obtained therewith. An additional economic advantage would result due to the ability to employ simplified process equipment with such a liquid stabilizer package.

SUMMARY OF THE INVENTION

In accordance with the present invention it is possible to prepare homogeneous liquid stabilizer systems capable of imparting improved antifogging and antistatic properties to polyvinyl chloride resins in addition to stabilizing said resin compositions. The stabilizer solutions are comprised of a partial ester of a polyglycerol, a metal salt of a monocarboxylic fatty acid, an epoxy plasticizer and an organic phosphorous compound. They are homogeneous solutions which do not undergo phase separation when allowed to stand at ambient conditions for prolonged periods. The instant stabilizer compositions are obtained through the utilization of a specific blending technique which consists of first forming a solution of the metal salt, the epoxy compound and the organo-phosphorous compound by heating at a temperature from about 125°C up to about 200°C to effect solution. The polyglycerol partial ester is then added to the resulting clear uniform solution and blended therewith. Stabilizer systems prepared following this procedure are liquids which do not separate upon standing and which can be readily blended with polyvinyl chloride employing conventional process equipment. The so-prepared liquid stabilizer may also be blended with plasticizers and employed as a masterbatch. Polyvinyl chloride resins compounded with the present liquid stabilizers exhibit a high degree of resistivity to oxidative, thermal and photochemical degradation as well as having improved antistatic and antifogging properties.

DETAILED DESCRIPTION

In accordance with the present invention homogeneous liquid stabilizer systems are obtained by the addition of partial esters of polyglycerols to a solution comprised of metal salts of carboxylic acids, organo-phosphorous compounds and epoxy compounds.

Any epoxy compound capable of functioning as a plasticizer may be employed to dissolve the metal carboxylate and organophosphorous compound but epoxidized oils are especially preferred. The epoxy compound will contain one or more epoxy groups per molecule and may be either aliphatic, cycloaliphatic, aromatic or heterocyclic in nature. Preferably, aliphatic or cycloaliphatic epoxy compounds containing from about 10 to 180 carbon atoms, and more preferably from about 20 to 150 carbon atoms, will be employed. Epoxy higher ester compounds known to be effective plasticizing agents are useful for this invention. Such esters may be derived from unsaturated alcohols and/or unsaturated acids wherein the ester is subsequently epoxidized at the site of the unsaturation. Alternatively, the unsaturated acid or alcohol may be epoxidized prior to the esterfication reaction. Typical unsaturated acids for this purpose are oleic, linoleic, linolenic, erucic and ricinoleic acids. These may be esterified with monohydric or polyhydric alcohols or mixtures thereof. Useful monohydric alcohols include butanol, 2-ethylhexanol, octanol, isooctanol, lauryl alcohol, stearyl alcohol, oleyl alcohol and the like. Polyhydric alcohols may include pentaerythritol, ethylene glycol, 1,2-propylene glycol, 1,4-butylene glycol, neopentyl glycol, glycerol, mannitol, sorbitol, ricinoleyl alcohol, and the like. The polyhydric alcohols may be fully or partially esterified.

Especially useful epoxy compounds for the instant invention are the epoxidized naturally occurring oils which consist of mixtures of higher fatty acid esters. Suitable oils include epoxidized soybean oil, epoxidized olive oil, epoxidized cottonseed oil, epoxidized coconut oil, epoxidized tall oil fatty acid esters, epoxidized tallow and the like. As an especially preferred embodiment of the present invention epoxidized soybean oil is employed. The useful epoxidized oils may be obtained by any known epoxidation method, such as the formic acid and sulfuric acid processes, employing any of the known epoxidizing agents.

Still other epoxy compounds may be present in combination with the aforementioned epoxy plasticizers. These epoxy compounds are usually not effective plasticizers but may be desirable in small amounts for the stabilizing properties which they impart. Typical epoxy compounds of this latter type are the epoxidized monocarboxylic acids, glycidyl ethers of polyhydric alcohols and phenols, epoxy polyethers of polyhydric phenols and the like. These epoxy stabilizers will generally not exceed about 10 weight percent of the total epoxy compound.

The metal carboxylate dissolved in the epoxy plasticizer is a polyvalent metal salt of a monocarboxylic organic acid containing from 6 to 36 carbon atoms. Preferably the acid will be an aliphatic monocarboxylic acid containing from about 12 to 20 carbon atoms. Mixed acids and mixed polyvalent metals may be employed to yield useful salts for this invention. The mixed fatty acids are derived from fats and oils such as tallow, coconut oil, cottonseed oil, soybean oil, corn oil, peanut oil or the like. Typical acids which can be employed are the following: caproic acid, capric acid, 2-ethylhexanoic acid, caprylic acid, pelargonic acid, hendecanoic acid, lauric acid, palmitic acid, stearic acid and the like. The polyvalent metals are preferably divalent metals such as barium, calcium, magnesium, zinc, cadmium, tin, copper, iron, cobalt and nickel. Especially useful divalent metals are calcium and zinc or mixtures thereof since these are suitable for use in nontoxic applications such as when the polyvinyl chloride resin is to be used for food-packaging film. Excellent results are obtained when zinc stearate is the metal carboxylate employed with the epoxy compound and organophosphorous compound.

Also dissolved in the epoxy plasticizer with the metal carboxylate compound is an organophosphorous compound. The organophosphorous stabilizer compounds useful for this invention are phosphites containing at least one -O-R group bonded to the phosphorous atom wherein R is a hydrocarbon radical such as aryl, alkyl, alkaryl, aralkyl and cycloaliphatic or a heterocyclic group. In general, the aforementioned R groups will contain from about 1 to about 25 carbon atoms and more preferably contain from about 6 to 20 carbon atoms. The phosphites of this invention are represented by the general formula

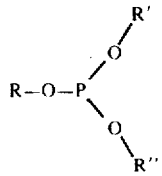

wherein R is one of the above-defined groups and R' and R'' are hydrogen or a radical as defined above for R. The R groups may be the same or they may differ. Phosphite stabilizer compounds of the above type include monophenyl phosphite, diphenyl phosphite, triphenyl phosphite, tricresyl phosphite, tri(octylphenyl) phosphite, tri(p-tert-nonylphenyl) phosphite, tri(nonylphenyl) phosphite, tribenzyl phosphite, tri(2-cyclohexyl) phosphite, tricyclohexyl phosphite, tricyclopentyl phosphite, tri(tetrahydrofurfuryl) phosphite, monoisooctyl phosphite, diisooctyl phosphite, triisooctyl phosphite, tridodecyl phosphite, diisooctyl phenyl phosphite, diphenyl decyl phosphite, issoctyl diphenyl phosphite, tri(2-ethylhexyl) phosphite and the like. Also useful are phosphite compounds wherein R' and R'' join to form ring systems illustrated in the formulae

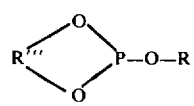

and

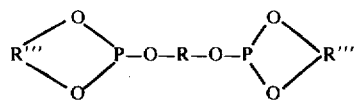

wherein R''' is a bivalent hydrocarbon radical and R is a monovalent radical, as previously defined, or a divalent radical derived therefrom. Triphosphites, that is, where R, R' and R'' are all hydrocarbon radicals, either the same or different, are a preferred embodiment of the instant invention. Tri(alkaryl) phosphites are especially preferred with tri(nonylphenyl) phosphite being especially useful since this phosphite has been approved by the Food and Drug Administration for use in polyvinyl chloride resin films for food packaging applications.

To achieve the desirable stabilizer compositions of the present invention, that is, highly effective liquid stabilizers, it is necessary that the metal carboxylate and phosphite compound, with any additional stabilizer components if such are to be employed, be dissolved in the epoxy compound prior to the addition of the polyglycerol partial ester. This is accomplished by heating a mixture containing appropriate amounts of the metal carboxylate, organophosphorous compound and epoxy compound in the temperature range from about 100°C up to about 200°C until solution has been effected. Preferably, while effecting solution the temperature will not exceed about 165°C. All that is necessary is that the temperature be slightly higher than the melting point of the highest melting component in the mixture. The length of time required to bring about solution will vary depending on the manner and temperature of heating, efficiency of stirring, the particular compounds employed, etc., and is not critical. As a general rule, however, the heating should not be continued at elevated temperatures after solution has been effected for such prolonged periods so as to promote decomposition of any of the components. While no absolute time for heating can be set out which will encompass all the possible process variations, the point at which solution is effected is easily recognized since the mixture will have been converted from an opaque, thick, white, paste-like mass to a clear and uniform, homogeneous solution. When this point is reached it may be desirable, to insure that complete solution has been achieved, to continue the heating for an additional short period.

As an alternative to the above procedure, the epoxy compound and either one of the other components may be heated separately to obtain a solution and the third component charged later. For example, the epoxy compound and phosphite compound may be mixed and to this solution molten metal carboxylate added. In this manner the heat history of the three-component mixture can be significantly reduced should this be desirable.

The so-prepared solution may contain from about 10 to 80% by weight of the organophosphorous compound but more preferably the phosphite stabilizer will comprise about 30 to 80 weight percent of the solution. The metal carboxylate will be varied from about 1 to 35 weight percent of the solution depending on the degree of stabilization required and the particular end-use application of the resin being stabilized. Sufficient epoxy plasticizer compound must be employed to dissolve the two stabilizer components. At least 5 weight percent epoxy compound is usually required, however, the amount generally will not exceed about 50% by weight. The amount of epoxy compound required will vary depending on the solubilities of the particular stabilizer components and the amounts employed.

While not essential, other components may also be present with the epoxy compound, metal carboxylate and organophosphorous compound. These may serve as supplemental stabilizers, for example where the end-use of the polyvinyl chloride resin requires such additional stabilization. For most film applications, the metal carboxylate, organophosphorous compound and epoxy compound in combination with the polyglycerol partial ester, which will be subsequently incorporated, is sufficient to impart the necessary antifogging and antistatic properties and also adequately stabilize the polyvinyl chloride resin compositions against the deleterious effects of oxygen, heat and light. If desired, however, known supplemental stabilizer compositions may also be added. The total amount of such supplemental stabilizers will not exceed about 10% by weight of the solution of metal carboxylate, phosphite and epoxy compounds. Supplemental light stabilizers derived from benzophenone and its derivatives such as 2,2'-dihydroxybenzophenone and 2-hydroxybenzophenone may be added. Other stabilizers such as those derived from benzotriazoles, triazines, and the phenysalicylates may also be employed. Phenolic type anti-oxidants may also be used including the hindered phenols containing one or two alkyl groups, preferably tertiary alkyl groups, immediately adjacent to the hydroxyl group on the aromatic nucleus. Phenolic compounds of the above types include phenol, resorcinol, catechol, cresol, 2,6-di-t-butyl phenol, 2,6-di-t-butyl-p-cresol, 2,2-bis(4-hydroxyphenyl)propane, methylene-bis(2,6-di-6-butyl phenol), methylene-bis(p-cresol), and the like. Polyvalent metal salts of substituted phenols, such as polyvalent metal phenolates, are also effective stabilizers and may be advantageously employed in the present invention.

Once the solution of the metal carboxylate, phosphite and epoxy compound has been obtained it may be allowed to stand at ambient conditions for any length of time prior to addition of the polyglycerol partial ester. Thus a masterbatch of these three components can be prepared, stored and employed as desired by adding thereto the particular polyglycerol partial esters.

To complete the makeup of the useful stabilizer compositions of the present invention a polyglycerol partial ester is added to the solution of the metal carboxylate, phosphite and epoxy compounds. The amount of polyglycerol partial ester will constitute between about 35 and about 85% by weight of the total stabilizer package. Depending on whether the stabilization or antifogging and antistatic properties of the resin are of primary importance, the amount of polyglycerol partial ester will be varied within the stated range. Quite unexpectedly it has been found that only when the components comprising the stabilizer system are added in this manner, i.e., the polyglycerol partial ester added to an already prepared solution of the other three components, are clear, homogeneous liquid stabilizer compositions obtained. Although it is essential that the polyglycerol partial ester be added at this stage of the reaction, the manner of addition is not critical. The partial ester may be added to the cooled solution or it may be charged to the solution which is maintained at a temperature up to about 160°C. In the latter instance, however, when addition of the polyglycerol partial ester is made to the hot solution the resulting mixture should not be maintained at these elevated temperatures for prolonged periods since the overall effectiveness of the resulting stabilizer composition will be reduced. If the final stabilizer solution containing all four components is subjected to an excessive heat history the amount of metal carboxylate required for acceptable stabilization is significantly increased and in some instances nearly tripled. It nevertheless may be advantageous to add the polyglycerol partial ester to heated solutions to reduce the viscosity, facilitate handling and minimize mixing time. If this technique is employed, immediately after a clear solution of the four components is obtained, the temperature should be reduced. As long as the temperature of the final solution is decreased to about 130°C or lower within about one hour, and more preferably within one-half hour time, after the addition of the polyglycerol partial ester no reduction in the effectiveness of the stabilizer is observed.

The partial esters employed are obtained by the partial esterification of polyglycerols with monocarboxylic acids. Only a portion of the hydroxyl functionality of the polyglycerol is utilized. The polyglycerols useful for formation of the partial esters are intermolecular glycerol ethers formed by the condensation of two or more glycerol molecules accompanied by the elimination of water. Such reactions are known to the art. The number of molecules condensed and molecular weight distribution of the resulting product is primarily a function of the temperature employed. In any event, the polyglycerols are mixtures of products containing from 2 up to as many as 30 glycerol units condensed. Suitable polyglycerols include, for example, diglycerol, triglycerol, tetraglycerol, pentaglycerol, hexaglycerol, heptaglycerol, octaglycerol, nonaglycerol, decaglycerol, pentadecaglycerol, triacontaglycerol and the like. The polyglycerol partial esters useful for this invention are preferably derived from polyglycerols containing 2 to 10 condensed glycerol units. The desired physical characteristics of the stabilizer and ultimate usage of the stabilized resin composition will dictate which polyglycerol or polyglycerol mixture is to be employed. Other polyether polyols such as the condensation products of sorbitol, mannitol, pentaerythritol, trimethylolpropane or mixtures thereof may also be esterified and employed in accordance with this invention.

To obtain the partial esters of the polyglycerols one or more monocarboxylic acids containing from about 6 to about 24 carbon atoms is esterified with the polyglycerol employing known esterification techniques, catalysts, etc. The esterification is conducted in such a way that the polyglycerol will not be completely esterified, that is, not all the hydroxyl groups will be reacted. For the purpose of this invention not more than 75%, and preferably less than about 50%, of the polyglycerol hydroxyl groups are reacted. The monocarboxylic acids are preferably fatty acids which are liquids at about room temperature, containing from about 8 to 18 carbon atoms. They may be saturated or contain unsaturation. Typical acids useful for partial esterification of the polyglycerol include octanoic acid, 2-ethylhexanoic acid, capric acid, lauric acid, myristic acid, palmitic acid, isostearic acid, oleic acid, stearic acid, eleostearic acid, palmitoleic acid, linoleic acid, linolenic acid, ricinoleic acid and the like. Mixtures of these and related acids may also be employed and are sometimes desirable. Such mixtures may contain both saturated and unsaturated acids and may be obtained from natural products such as vegetable and animal fats and oils. Coconut oil, cottonseed oil, linseed oil, olive oil, soybean oil, tallow, lard, tall oil, peanut oil and tung oil are typical sources useful to provide mixed acids suitable for esterification with the polyglycerol. When solely saturated acids are to be esterified with the polyglycerol a source which provides saturated acids may be employed or a mixture of saturated and unsaturated acids obtained from any source may be hydrogenated prior to use.

In accordance with the present invention the liquid four-component stabilizer systems are useful with polyvinyl chloride homopolymers and copolymers. They may be employed with vinyl polymers derived from one or more vinyl monomers, i.e., containing a

group, including: vinyl chloride; vinyl bromide; vinyl acetate; vinylidene chloride; lower allyl esters; vinyl alkyl ethers; acrylic and methacrylic esters such as ethyl acrylate, methyl acrylate and methyl methacrylate; acrylic acid and methacrylic acid; acrylonitrile and methacrylonitrile; and the like. Copolymer compositions obtained by the copolymerization of vinyl chloride with vinyl acetate, vinyl chloride with vinyl butyrate, vinyl chloride with vinyl propionate, vinyl chloride with vinylidene chloride, vinyl chloride with methylacrylate, vinyl chloride with 2-ethylhexylacrylate, and vinyl chloride with two or more monomers such as mixtures of vinylidene chloride and 2-ethylhexyl acrylate are also effectively stabilized. The present stabilizer compositions may be used with acrylonitrile-butadiene-styrene terpolymers, chloroprene polymers, butadiene-styrene polymers, butadiene-acrylonitrile copolymers, polystyrene, polyacetals and the like. These liquid stabilizers may also be employed with blends of one or more of the above polymer compositions. The liquid stabilizer compositions of this invention are especially effective for use with polyvinyl chloride homopolymer resins suitable for film applications.

In general, the amount of liquid stabilizer may range from about 0.5 to about 25 parts by weight per 100 parts of the vinyl resin. Excellent results are obtained when about 2.0 to about 6.0 parts by weight of the liquid stabilizer are employed per 100 parts by weight polyvinyl chloride. Such compositions exhibit a high degree of resistance to oxidative, thermal and photochemical degradation, in addition to having excellent antifogging and antistatic properties.

The present stabilizer compositions, being liquids, are readily incorporated into the vinyl polymers. Conventional mixing techniques may be employed. The stabilizers may be used immediately after preparation, or since the present liquid compositions do not separate upon standing, they may be stored and used as required without prior mixing.

Known compounding methods for incorporating ingredients into resins such as kneading, milling and mixing with a Banbury or ribbon mixer may be employed. The stabilizer compositions may be added as such, added as a masterbatch solution or emulsified and the emulsion added to the polymeric material. In general, the resins modified with the stabilizer compositions of this invention possess excellent milling characteristics and require no special processing. The stabilizer compositions may be used in conjunction with other plasticizing agents such as dioctyl phthalate, diisooctyl phthalate, dioctyl adipate, trioctyl phosphate, various polymeric plasticizers and the like. Other compounding ingredients including antioxidants, such as amines and phenols, pigments and other colorants, fillers, lubricants, antisticking agents, curing agents and the like may also be utilized therewith. The present stabilizer compositions and any additional compounding ingredients may be prepared as a masterbatch and added to the polymer as such or the liquid stabilizer and the additional ingredients may be mixed into the resin separately.

The following examples illustrate the invention more fully, however, they are not intended as a limitation on the scope thereof. In the examples all parts and percentages are given on a weight basis unless otherwise indicated.

EXAMPLE I

A masterbatch solution of an epoxy compound, metal carboxylate and phosphite stabilizer compound was prepared by thoroughly mixing 12 grams zinc stearate, 75 grams tri(nonylphenyl) phosphite and 108 grams epoxidized soybean oil having an oxirane value of about 6.8 to 7.0. The mixture was heated to about 150°C with agitation until a clear yellowish solution was obtained (about 1 hour). The solution was then allowed to cool and employed as a masterbatch solution for blending with the polyglycerol partial esters.

The masterbatch solution without the addition of polyglycerol partial ester is, by itself, a useful stabilizer for polyvinyl chloride resins. (Diamond example, when 100 parts polyvinyl chloride homopolymer (Diamong Shamrock 450), 10 parts epoxidized soybean oil, 20 parts dioctyl phthalate, 0.25 part stearic acid and 2.5 parts of the so-prepared masterbatch solution were blended and milled at 350°F for approximately 5 minutes, clear, water-white films having excellent heat stability were obtained.

EXAMPLE II

A polyglycerol partial ester was prepared as follows: 1980 grams (8.33 mol) of a polyglycerol having a hydroxyl value of about 1280 which corresponds to about 2.3 glycerol units condensed, 1287 grams (8.33 mol) mixed fatty acids comprised of $C_8$-$C_{10}$ normal acids and 1155 grams (4.14 mol) oleic acid were combined in a flask. The reaction mixture was heated (235°C Max.) with stirring and allowed to react until the acid value of the mixture was substantially nil. About 30% of polyglycerol hydroxy groups were reacted. The reaction mixture was then cooled and stored for subsequent use. No catalyst was employed for this esterification reaction, however, similar esterifications were conducted employing hypophosphorous acid.

EXAMPLE III

Sixty-five grams of the liquid product of Example I and 35 grams of the polyglycerol partial ester of Example II were mixed at room temperature and a clear, homogeneous liquid obtained. Samples of the so-prepared solution showed no evidence of phase separation after storage for over 10 months at room temperature. The stabilizer solution was incorporated into polyvinyl chloride homopolymer in accordance with the following recipe:

| | |
|---|---|
| Polyvinyl chloride (Diamond Shamrock 40) | 40 parts |
| Epoxidized soybean oil (6.8–7.0 oxirane value) | 9 parts |
| Dioctyl azelate | 9 parts |
| Stearic acid | 0.5 part |
| Liquid stabilizer | 3.0 parts |

The ingredients were blended and milled at 350°F for about 5 minutes. The water-white films were suitable for use as hard packaging films and had excellent lubricity or "slip". The films, in addition to having excellent heat stability, also had markedly improved antifogging and antistatic properties.

When 35 grams of the partial ester of Example II, 4 grams zinc stearate, 25 grams tri(nonylphenyl) phosphite and 36 grams epoxidized soybean oil were combined as a unit charge and blended together at room temperature a paste-like mass was recovered. When this mixture was heated up to as high as 160°C a relatively clear melt was obtained but upon cooling to room temperature and upon standing there was appreciable phase separation and a precipitate settled from solution. This precipitate could not be redissolved with any amount of treatment to obtain a clear solution. No amount of heating or any other treatment was capable of producing clear, homogeneous liquids which retained their homogeneity upon standing when all the four components were combined as a unit charge.

EXAMPLE IV

A liquid stabilizer composition having superior antifogging and antistatic properties was prepared as follows: 280 grams zinc stearate, 200 grams epoxidized soybean oil and 520 grams tri(nonylphenyl) phosphite were heated at 150°C and the heating terminated when a clear solution was obtained. After cooling the mixture to about 60°C, 3000 grams of the polyglycerol partial ester of Example II was added with stirring. The resulting clear, homogeneous liquid stabilizer was compounded with polyvinyl chloride resin to prepare a meat packaging film in accordance with the following recipe:

| | |
|---|---|
| Polyvinyl chloride homopolymer (Diamond Shamrock 450) | 100 parts |
| Dioctyl adipate | 18 parts |
| Epoxidized soybean oil | 9 parts |
| Ethylene-bis-stearamide | 0.25 part |
| Liquid stabilizer | 2.5 parts |

The ingredients were blended and milled at 350°F for about 5 minutes. Thirty-five mil and 3 mil clear sheets were obtained.

Oven heat stability tests were conducted using 1 inch × 1 inch squares cut from the 35 mil sheet by placing the samples on eight glass trays fitted on a rotating device in an electric oven maintained at 375°F. The heating is continued for 80 minutes with one glass slide being removed after each ten-minute interval. Each slide is cooled after removal from the oven and the test specimen removed for observation and comparison. Samples stabilized in accordance with the present invention withstood the entire eighty-minute heating period without failure, that is, without degradation or severe discoloration and charring. After 80 minutes the samples were clear and had an amber color.

A 3 mil sheet was employed to evaluate the antifogging properties by stretching the film over a 250 ml beaker 2/3 full of water heated to 80°C. This is is conventional test employed in the art to measure resistance of films to fogging. The film compounded in accordance with the above recipe showed no fogging (condensation of water droplets on the film) even after 10 minutes.

EXAMPLE V

Five parts zinc stearate, 5 parts calcium stearate, 7 parts epoxidized soybean oil and 23 parts tri(nonylphenyl) phosphite were heated up to about 150°C until a clear solution was achieved. The solution was cooled and blended with 60 parts of the polyglycerol partial ester of Example II. The resulting opaque liquid, when used to stabilize polyvinyl chloride homopolymer resin at a three-part level, gave good antifogging and antistatic properties as well as excellent heat stability.

EXAMPLE VI

Sixty-five grams of the liquid prepared in Example 1 was combined with 35 grams of the partial ester of a polyglycerol prepared by the esterification of 1 mol diglycerol with 1.3 mols oleic acid employing hypophosphorous acid catalyst. Polyvinyl chloride homopolymer resins containing about 3 parts of the resulting liquid stabilizer and tested in accordance with the above-described procedures had superior antifogging properties and heat stability.

EXAMPLE VII 1.5 Parts zinc stearate, 5 parts epoxidized soybean oil and 10 parts tri(nonylphenyl) phosphite were heated to about 140°C to effect solution. Eighty-three parts of an ester prepared by the reaction of 1 mol triglycerol with 2 mols mixed fatty acids was then added to the cooled solution. The resulting stabilizer solution was employed in the following recipe:

| | |
|---|---|
| Polyvinyl chloride copolymer (90 mol % vinyl chloride 10 mol % vinyl acetate) | 100 parts |
| Impact modifier (Rohm & Haas KM636) | 10 parts |

-continued

| | |
|---|---|
| Epoxidized soybean oil | 5 parts |
| Liquid stabilizer | 2.5 parts |

Samples of the rigid resin were evaluated for heat stability at 360°F and withstood up to 40 minutes oven-aging with no serious discoloration.

EXAMPLE VIII

Diphenyl decyl phosphite (13 grams) was heated (150°C max.) with 7 grams zinc stearate and 5 grams epoxidized soybean oil until a clear solution was obtained. The solution was cooled and 75 grams of the ester of Example II added thereto. The resulting stabilizer solution, while more viscous than solutions prepared with tri(nonylphenyl) phosphite, flowed readily at room temperature. Polyvinyl chloride resin homopolymer stabilized with this stabilizer solution had good physical properties, heat stability and anti-fogging properties.

EXAMPLE IX

To demonstrate the versatility of the present process for the preparation of improved liquid stabilizers with antifogging and antistatic properties, Example IV was repeated heating to a maximum temperature of 135°C to effect solution of the zinc stearate, epoxidized soybean oil and tri(nonylphenyl) phosphite. The polyglycerol partial ester was then added to the hot (135°C) solution and the mixture cooled to about 50°C within about 30 to 45 minutes. The liquid stabilizer prepared in this manner was comparable in all respects to the stabilizer composition of Example IV.

The procedure was repeated except that the solution was not immediately cooled after addition of the polyglycerol partial ester. The stabilizer solutions obtained were unacceptable. For example, when the mixture was maintained at 135°C for 24 hours the brilliance of color imparted by the stabilizer is lost and water-white films are no longer obtained. Instead the films have a yellowish discoloration. These films, when subjected to oven-aging at 375°F develop more discoloration after 10-20 minutes than resin samples stabilized with the liquid compositions prepared in accordance with this invention after about 80 minutes oven-aging.

We claim:

1. A method for stabilizing vinyl polymer resin to impart antifogging and antistatic properties and improve heat stability which comprises:
   1. admixing at a temperature of 100°C to 200°C until solution has been effected (a) 5 to 50 parts by weight aliphatic or cycloaliphatic epoxy compound containing from 10 to 180 carbon atoms, (b) 1 to 35 parts polyvalent metal salt of a monocarboxylic acid containing from 6 to 26 carbon atoms and (c) 10 to 80 parts organophosphorous compound of the formula

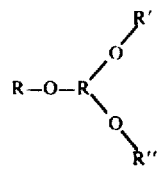

wherein R is a hydrocarbon radical containing from 1 to 24 carbon atoms and selected from the group consisting of aryl, alkyl, alkaryl, aralkyl, and cycloaliphatic and R' and R" and hydrogen or R;
   2. adding 35 to 85 parts of a partial ester of a polyglycerol having not more than 75% of the polyglycerol hydroxyl groups reacted and derived from a $C_{6-24}$ monocarboxylic acid and a polyglycerol containing 2 to 30 condensed glycerol units; and
   3. incorporating 0.5 to 25 parts by weight of the resulting liquid stabilizer into 100 parts polyvinyl chloride homopolymer or copolymer.

2. The method of claim 1 where in step (1) the temperature does not exceed 165°C, (a) contains from 20 to 150 carbon atoms, (b) is the zinc salf or a mixture of calcium and zinc salts of an aliphatic monocarboxylic acid containing from 12 to 20 carbon atoms, (c) is a phosphite compound with R groups containing 6 to 20 carbon atoms and the polyglycerol partial ester has less than 50% of the polyglycerol hydroxyl groups reacted and is derived from a fatty acid containing 8 to 18 carbon atoms and a polyglycerol containing 2 to 20 condensed glycerol units.

3. The method of claim 2 wherein 2 to 6 parts by weight of the liquid stabilizer is incorporated into a film-forming polyvinyl chloride polymer.

4. The method of claim 3 wherein (a) is an epoxidized naturally occuring oil, (b) is zinc stearate and (c) is tri(nonylphenyl) phosphite.

5. The stabilized resin composition of claim 1.

* * * * *